United States Patent [19]

Worrall

[11] 4,047,904
[45] Sept. 13, 1977

[54] CONTROL SYSTEMS FOR ADSORBER UNITS

[75] Inventor: Michael John Worrall, Hockley, England

[73] Assignee: The British Ceca Company Limited, London, England

[21] Appl. No.: 607,080

[22] Filed: Aug. 22, 1975

[30] Foreign Application Priority Data

Sept. 12, 1974 United Kingdom ............... 39869/74

[51] Int. Cl.$^2$ ............................................. B01D 57/00
[52] U.S. Cl. ......................................... 55/18; 55/161; 55/179
[58] Field of Search ...................... 55/67, 74, 387–388, 55/161, 179, 18; 23/255 E, 163

[56] References Cited

U.S. PATENT DOCUMENTS

| 3,519,398 | 7/1970 | Roberts | 55/74 X |
| 3,807,217 | 4/1974 | Wilkins et al. | 55/67 X |
| 3,948,602 | 4/1976 | Solomon | 55/67 X |

Primary Examiner—Frank A. Spear, Jr.
Assistant Examiner—E. Rollins Cross
Attorney, Agent, or Firm—Ladas, Parry, Von Gehr, Goldsmith & Deschamps

[57] ABSTRACT

A control system for use with an adsorber unit, of particular use in controlling multi-unit adsorber systems, comprises means for detecting in exhaust from the adsorber, gas or vapour to be adsorbed in the parts per million range, and means for switching the adsorber units from which the exhaust issues from an adsorbtive to a regenerative mode when said gas or vapour is detected in the exhaust in an amount in excess of a predetermined level.

7 Claims, 1 Drawing Figure

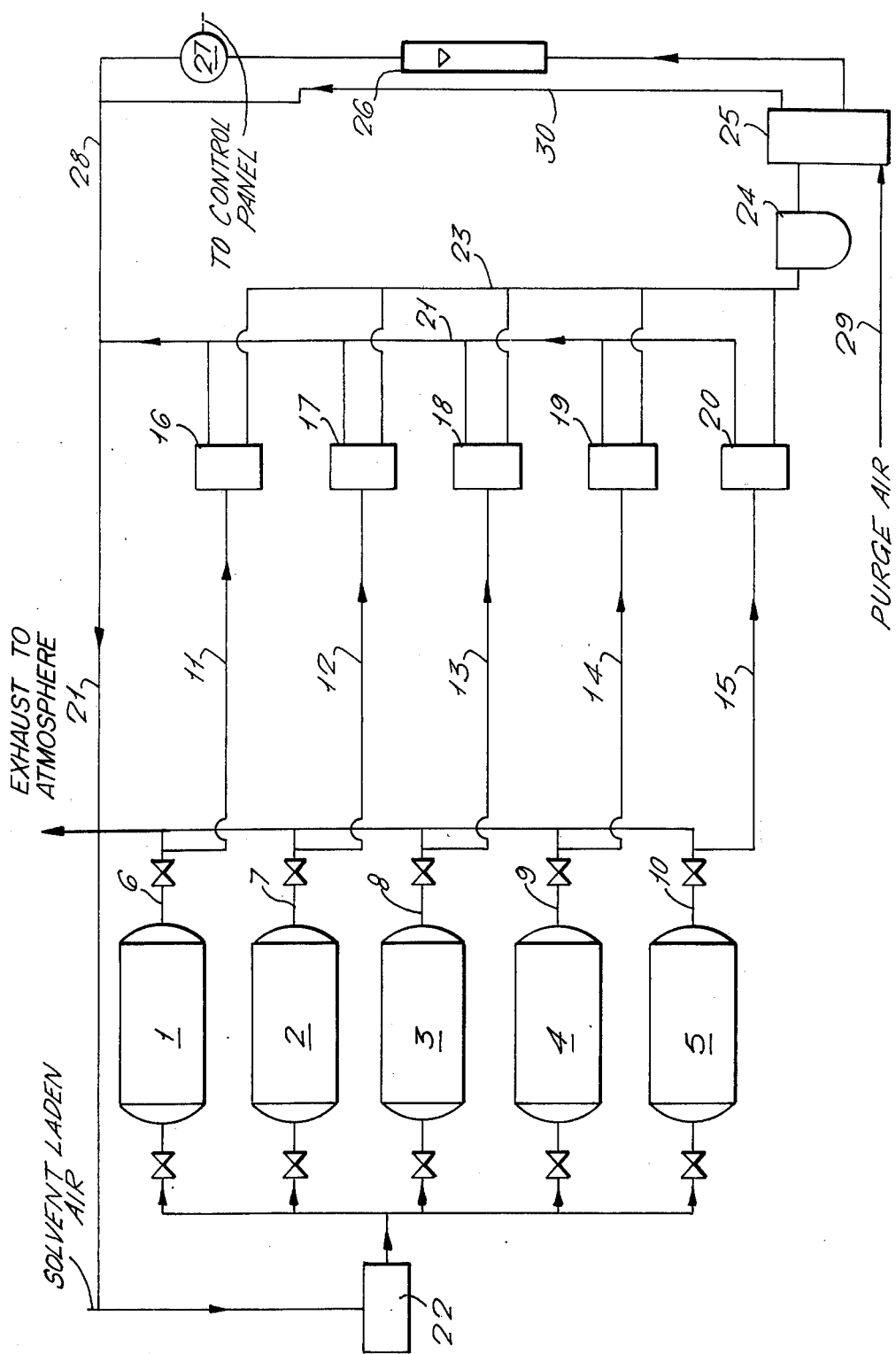

CONTROL SYSTEMS FOR ADSORBER UNITS

The present invention relates to a control system for a set of adsorber units.

Conventionally for adsorbing undesired gases or vapours, such as solvent vapour, from a gas stream the gas stream is passed through an adsorber unit forming part of a set. Whilst one, or more, of the units being employed in an adsorbent mode at least one other in the set is being regenerated by removal of adsorbed material therefrom, for example by passing heated dry gas, or by steaming to remove solvent.

Hitherto control of whether a particular unit was being employed in an adsorber mode or whether it was being regenerated at any given instant has been controlled simply by time clocks. Clocks are fitted to a switching mechanism so that after a given period a particular unit is switched from adsorption to regeneration or vice versa. Frequently an overriding control is also fitted so that if it is known that a unit has been underutilised in a particular period it can carry on adsorbing for longer than would normally be permitted by the timer. Such methods of control, however, lack precision and it is not possible to operate a set of adsorbers with the maximum theoretical efficiency since in order to ensure that an adsorber unit does not become overloaded and therefore cease to adsorb efficiently it is necessary to stop adsorption well before the period in which such a situation will come about has expired. Such a method of control reduces the overall efficiency of the operation as adsorbers are regenerated more frequently than is actually necessary. This results in unnecessary consumption of reactivation media, hot gases or steam which are the prime operating cost of such processes and whose cost is continually increasing due to escalating energy costs.

In the past vapour detectors have been employed in chemical plants to detect leaks of solvent vapour. However, so far as the Applicants are aware no proposal has been made to control adsorption regeneration cycles of adsorber units by means of such vapour detectors.

According to the present invention there is provided a control system for an adsorber unit which comprises means for detecting in the exhaust gas from an adsorber concentrations of the gas or vapour to be adsorbed in the ppm range and means for switching said adsorber from adsorption to a regenerative mode when said gas or vapour to be adsorbed is detected in the exhaust gas in an amount in excess of a predetermined level.

Suitable means for detecting the gas or vapour to be adsorbed at the level at which switching is to be affected includes gas chromatography means, flame ionisation means and means for measuring by means of a Wheatstone bridge changes in resistance caused by low temperature catalytic combustion of the solvent vapour when present. In cases where only a small number of adsorbers are employed, such as two or three adsorbers, suitable control may be obtained by simply sampling the total exhaust, since the solvent concentration in the exhaust from the adsorber passing solvent in the highest concentration is only diluted with one or two times its own volume of gas containing lower concentrations of solvent. For more precise control or when a greater number of adsorbers are employed, however, means should be provided to permit sampling of the exhaust from each adsorber separately over the latter period of its adsorption cycle.

The drawing shows a typical absorber system in which the control system of the present invention finds use.

A set of five adsorber units (1, 2, 3, 4, 5) fitted with conventional inlet for solvent laden air and steam and means for switching from introduction of solvent laden air to steam and vice versa have connected to the outlet line of each adsorber (6, 7, 8, 9, 10) a sampling line (11, 12, 13, 14, 15) leading to sampling valves (16, 17, 18, 19, 20) which control of solvent. Purge air via line 29 can be passed. The valves 16, 17, 18, 19, 20 and 25 are all activated by pneumatic means from the control panel. The solvent detector 27 is connected electrically to the control panel.

In operation flow rates are normally adjusted so that four of the adsorber units are operating in an adsorbing mode at any one time and the other is being regenerated by steaming. The adsorber which is next due to be steamed is selected to have its exhaust air analysed by suitable control of valves 16, 17, 18, 19, 20 and 25. The level of solvent present in the exhaust is detected by the detector 27 which transmits a signal back to the indicating or recording instrument in the control panel and the adsorbers remain employed in the adsorption role until a preset level of solvent in exhaust is detected. At this point the main cycle control is switched to change the adsorber from adsorption to regeneration and the sample valves change to monitor the adsorber next due for steaming.

It has been found, however, that for accurate operation it is desirable to pass purging air through the detector 27 at regular intervals. This is effected by suitable use of valve 25 connected to a source of purge gas. Valve 25 can be actuated by signals from the cycle control or separate timers.

In order to obtain optimum efficiency of the system and in order to avoid condensation in the sample lines and analyser it is desirable that a continuous flow be maintained through all lines. Similarly when purge air is being passed through valve 25 the exhaust sample from one of the adsorbers can pass through the system up to this point and then be recycled via line 30.

In order to obtain true readings it is desirable not to pass the sample of exhaust through detector 27 in the period immediately following return of a particular adsorber to an adsorption role after being steamed.

It is of course possible to employ the control system of the invention with the traditional time-based switching system if desired, simply using the control system of the invention to override a switch to steaming a particular adsorber if by the preset time insufficient solvent vapour is detected in the exhaust stream.

It is particularly preferred that detectors employed in the system of the invention are of the low temperature catalytic combustion types and that regular purging of the detector with dry air is effected.

Control systems of the present invention may find use in conjunction with adsorber units of any type, for example multiple single bed adsorbers of the traditional design or more modern multibed adsorbers such as that described in copending U.S. patent application No. 463,030 filed on Apr. 22, 1974, which is incorporated herein by reference.

I claim:

1. A vapor adsorber system consisting essentially of an inlet for air containing vapor to be adsorbed, a plurality of vapor adsorber units connected to said inlet, which are arranged to be utilized and regenerated in a sequence and which each include a respective exhaust outlet leading to atmosphere, a respective sample line connected to each adsorber exhaust unit, a sample exhaust line, an analyzer line, a plurality of first two way valves arranged respectively to connect selectively each said sample line to said sample exhaust line or direct to said analyzer line, an analyzer means for detecting concentrations of vapor to be adsorbed in the ppm range, a source of purge gas for said analyzer, valve means arranged to connect selectively said analyzer either to said analyzer line or to said source of purge gas, and control means operative upon said two way valves to connect the sample line associated with one adsorber unit in use to said analyzer whilst connecting the sample lines associated with the other adsorber units to said sample exhaust line and operative in response to detection by said analyzer of a concentration of vapor to be adsorbed above a predetermined level, to cause a further adsorber unit to be brought into use and said one adsorber unit regenerated, and to cause said analyzer to be connected to said source of purge gas for a predetermined time, said connection of said one sample line to said analyzer being such that only gases and vapors emitted from the said one adsorber are passed to the analyzer.

2. A vapour adsorber system according to claim 1, wherein said control means is further generative upon said second valve means to connect said analyser line to said inlet for air containing vapour to be adsorbed when said analyser is connected to said source of purge gas.

3. A vapour adsorber system according to claim 1, wherein said analyser is of the low temperature catalytic type.

4. A vapour adsorber system according to claim 1, wherein said sample exhaust line is connected to said inlet for air containing gas to be adsorbed.

5. A vapor adsorber system consisting essentially of
an inlet for air containing vapor to be adsorbed,
at least two adsorber units which are arranged to be utilized and regenerated in sequence,
an exhaust outlet to atmosphere which is common to said adsorber units,
a sample line connected to said exhaust outlet,
an analyzer means for detecting concentrations of vapor to be absorbed in the ppm range,
a source of purge gas for said analyzer, valve means arranged either to connect said sample line to said analyzer in such manner that only gases or vapors emitted from said adsorbers are passed to said analyzer, or to connect said sample line to said sample exhaust line and said source of purge gas to said analyzer, and
control means operative upon said valve means to connect the sample line to the analyzer during use of one adsorber, and operative in response to detection by said analyzer of a concentration of vapor to be adsorbed above a predetermined level, to cause a further adsorber to be brought into use and the one adsorber regenerated and to cause said source of purge gas to be connected to said analyzer for a predetermined period of time.

6. A method of operating a vapor adsorber system having a plurality of adsorber units in which each adsorber unit is to be regenerated in turn when the unadsorbed vapors in its exhaust reach a predetermined level consisting essentially of the steps of: passing a sample consisting solely of exhaust of the next-to-be regenerated adsorber to an analyzer capable of detecting concentrations of vapor to be adsorbed in the ppm range while passing corresponding samples from the exhaust of each other adsorber to a sample exhaust line; analyzing said sample which is passed to the analyzer for its content of unadsorbed vapor; switching said adsorber to the regenerative mode when the unadsorbed vapors detected in said sample reach the said predetermined level and switching its sample line to exhaust; passing clean purge gas through the analyzer and then passing a sample from the next-to-be regenerated adsorber to the analyzer.

7. A method of operating a vapor adsorber system having at least two adsorber units having a common exhaust line in which each adsorber unit is to be regenerated in turn when the unadsorbed vapors in the exhaust from the system reaches a predetermined level consisting essentially of the steps of: passing a sample consisting solely of the gases and vapors from the common exhaust line to an analyzer capable of detecting concentrations of the vapor to be absorbed in the ppm range; analyzing said sample for its content of unadsorbed vapor; and when the unadsorbed vapors detected in said sample reach said predetermined level, switching the said adsorber to the regenerative mode, switching the sample to exhaust; passing clean purge gas through the analyzer, and then reconnecting the exhaust line to the analyzer to monitor the next-to-be regenerated adsorber.

* * * * *